(12) United States Patent
Chari et al.

(10) Patent No.: US 7,512,937 B2
(45) Date of Patent: Mar. 31, 2009

(54) INTEGRATED VISUAL AND LANGUAGE-BASED METHOD FOR REUSABLE DATA TRANSFORMATIONS

(75) Inventors: Srinivas Chari, Toronto (CA); Crystal Su, Toronto (CA); Milorad Stefanovic, Markham (CA); Dirk Alexander Seelemann, II, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 10/753,857

(22) Filed: Jan. 8, 2004

(65) Prior Publication Data

US 2005/0137852 A1   Jun. 23, 2005

(30) Foreign Application Priority Data

Dec. 17, 2003   (CA) .................................... 2453605

(51) Int. Cl.
*G06F 9/44* (2006.01)
*G06F 9/45* (2006.01)

(52) U.S. Cl. ........................ 717/137; 717/109; 717/113; 717/140

(58) Field of Classification Search ................. 717/113, 717/137, 140
See application file for complete search history.

(56) References Cited

U.S. PATENT DOCUMENTS

| | | | | |
|---|---|---|---|---|
| 5,421,008 | A | * | 5/1995 | Banning et al. ................. 707/4 |
| 5,652,874 | A | | 7/1997 | Upson et al. |
| 5,694,578 | A | | 12/1997 | Upson et al. |
| 5,911,070 | A | * | 6/1999 | Solton et al. ................. 717/105 |
| 6,032,144 | A | * | 2/2000 | Srivastava et al. ............... 707/3 |
| 6,282,699 | B1 | | 8/2001 | Zhang et al. |
| 6,546,549 | B2 | * | 4/2003 | Li ............................... 717/137 |
| 6,662,356 | B1 | * | 12/2003 | Edwards et al. ............. 717/113 |
| 6,993,717 | B2 | * | 1/2006 | Minninger ................... 715/523 |

OTHER PUBLICATIONS

Zheng, M. and Rada, R. 1993. Text-hypertext mutual conversion and hypertext interchange through SGML. In Proceedings of the Second international Conference on information and Knowledge Management (Washington, D.C., United States, Nov. 1-5, 1993). B. Bhargava, T. Finin, and Y. Yesha, Eds. CIKM '93. ACM Press, New York, NY, 139-147.*
Aho, Sethi, and Ullman, "Compilers: Principles, Techniques, and Tools", 1986, Addison-Wesley, ISBN 0-201-10088-6, Chapter 1.*
Integrated Visual and Language-Based System and Method of Reusable Data Transformations U.S. Appl. No. 10/753,856, filed Jan. 8, 2004, Inventor: Chari et al.
Integrated Visual and Language-Based System and Method for Reusable Data Transformations, U.S. Appl. No. 10/753,856, filed Jan. 8, 2004, Inventor: Chari et al.

* cited by examiner

*Primary Examiner*—Tuan Q Dam
*Assistant Examiner*—James Rutten
(74) *Attorney, Agent, or Firm*—Stephen R. Tkacs; Stephen J. Walder, Jr.; Herman Rodriguez (57) ABSTRACT

A method deploys a set of coupled data transformation modules describing a data transformation, the data transformation for transforming a data structure from a first format to a second format. The method includes receiving an instruction for selecting the set of transformation modules from a memory; converting each of the set of transformation modules to a common model format, the set of modules having at least one transformation module being of a module type of a type set including language constructed modules and visually constructed modules; and generating an executable version of the converted transformation modules suitable for execution by a data transformation engine. The executable version, when executed, transforms the data structure from the first format to the second format.

3 Claims, 9 Drawing Sheets

INTEGRATED VISUAL AND LANGUAGE-BASED METHOD FOR REUSABLE DATA TRANSFORMATIONS

FIELD OF THE INVENTION

The present invention relates to deployment environments for supporting the coexistence of a visual transformation and a language transformation architecture.

BACKGROUND OF THE INVENTION

Development of transformation applications involves multiple players and roles. On one hand, high level transformation scenarios are typically designed by business analysts. On the other hand, application implementation, with technical requirements such as performance, is typically handled by highly specialized application programmers or developers. These two types of players have diverse backgrounds, different perspectives of the problem domain, and often times very different programming skills. Their responsibilities are different, but they also must communicate with each other and work together to produce an efficient, scalable and maintainable transformation system.

An environment based exclusively on visual transformation methods can provide all benefits associated with visual programming, such as ease of use. Transformation modules developed in this way can take advantage of some existing language-based artifacts under specific conditions. However, language based artifacts cannot take advantage of the visually developed artifacts. There is no round trip since visual tools produce proprietary formatted artifacts that are not accessible to programming languages in the public domain.

When a transformation system is developed using visual tools, it is usually easier to prototype, but it is not optimal when the transformation load increases due to the inherent properties of visual programming. Visual programming targets fairly coarse grained transformations. On the other hand, language-based transformations scale very well from a performance point since optimizations can be used at a very fine grain. However, it is harder to maintain as the complexity of the tool increases, and even experienced developers will need more time to ensure system integrity, since the effects of the change are harder to predict. There is a trade-off between these two factors when we consider the two approaches in a transformation of the data structures.

These input data structures represent different kinds of information stored in various storage and transmission formats, which describe the domain in which the transformation operates. For instance, the transformation domain for SQL (Structured Query Language) is Relational Database (RDB) tables and columns. The domain for the EJB (Enterprise Java™ Beans) mapping tool in IBM WebSphere® Studio Advanced Developer includes EJB fields and RDB tables and columns. The transformation domain for TIBCO Software's mapping tool, BEA System's eLink™ family of tools, and IBM WebSphere MQ Integrator includes messages and RDB tables and columns.

Traditionally, there have been two different approaches to perform data transformation. These approaches have proven to be mutually exclusive in usage. The different approaches include either visual based tools or language based tools. Language based tools were used to perform data transformations since a programming languages can be exploited to achieve highly complex and efficient transformations. It was observed over a period of time that a significant proportion of such data transformations are straightforward assignment mappings from one field to the other. This led to the development of visual tools to make this process simpler and quicker to achieve for the most part. However, some complex scenarios are difficult or not possible to achieve using these visual tools alone. This is because a visual tool is designed for ease of use and higher level analysis, not for greatest optimization. Therefore, some of the optimizations that are possible using language based transformation modules are not feasible when using a graphical engine to generate the transformation modules used to perform the transformations of the data structures. There are proponents for each approach leading to solutions that used one approach or the other.

SUMMARY OF THE INVENTION

The present invention provides, for a programming and corresponding development environment, a data transformation module (that is, a programming tool) for supporting coexistence of a visual method of transforming data structures and a language-based method of transforming data structures. Data transformation (that is, the transforming of data structures) is the process manipulating or transforming data to and from storage and transmission formats. The programming environment supports interoperability and seamless reuse of the transformation modules created by the visual method and by the language-based method.

According to the present invention there is provided a method for deploying a set of coupled data transformation modules describing a data transformation, the data transformation for transforming a data structure from a first format to a second format, the method including the steps of: receiving an instruction for selecting the set of transformation modules from a memory; converting each of the set of transformation modules to a common model format, the set of modules having at least one transformation module being of a module type of a type set including language constructed modules and visually constructed modules; and generating an executable version of the converted transformation modules suitable for execution by a data transformation engine; wherein the executable version when executed transforms the data structure from the first format to the second format.

According to a further aspect of the present invention there is provided a system for deploying a set of coupled data transformation modules describing a data transformation, the data transformation for transforming a data structure from a first format to a second format, the system including: a memory for storing the set of transformation modules; a format module for converting each of the set of transformation modules to a common model format, the set of modules having at least one transformation module being of a module type of a type set including language constructed modules and visually constructed modules; and a deployment engine for receiving an instruction to select the set of converted transformation modules and for generating an executable version of the converted transformation modules suitable for execution by a data transformation engine; wherein the executable version when executed transforms the data structure from the first format to the second format.

According to a still further aspect of the present invention there is provided a computer program product for deploying a set of coupled data transformation modules describing a data transformation, the data transformation for transforming a data structure from a first format to a second format, the computer program product comprising: a computer readable medium; a format module stored on the medium for converting each of the set of transformation modules to a common model format, the set of modules having at least one transformation module being of a module type of a type set including language constructed modules and visually constructed modules; and a deployment engine module coupled to the format module for receiving an instruction to select the set of converted transformation modules from a memory and for generating an executable version of the converted transformation modules suitable for execution by a data transformation engine; wherein the executable version when executed transforms the data structure from the first format to the second format.

According to a further aspect of the present invention there is provided a computer readable medium containing computer executable code for deploying a set of coupled data transformation modules describing a data transformation, the data transformation for transforming a data structure from a first format to a second format, the code including the steps of receiving an instruction for selecting the set of transformation modules from a memory; converting each of the set of transformation modules to a common model format, the set of modules having at least one transformation module being of a module type of a type set including language constructed modules and visually constructed modules; and generating an executable version of the converted transformation modules suitable for execution by a data transformation engine; wherein the executable version when executed transforms the data structure from the first format to the second format.

BRIEF DESCRIPTION OF THE DRAWINGS

A better understanding of these and other embodiments of the present invention can be obtained with reference to the following drawings and detailed description of the preferred embodiments, in which.

It is noted that similar references are used in different figures to denote similar components.

DETAILED DESCRIPTION OF THE EMBODIMENTS

The following detailed description of the embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the C or C++ or Java computer programming language (or other computer programming languages in conjunction with C/C++). Any limitations presented would be a result of a particular type of operating system, computer programming language, or data processing system and would not be a limitation of the present invention.

Figure 1:
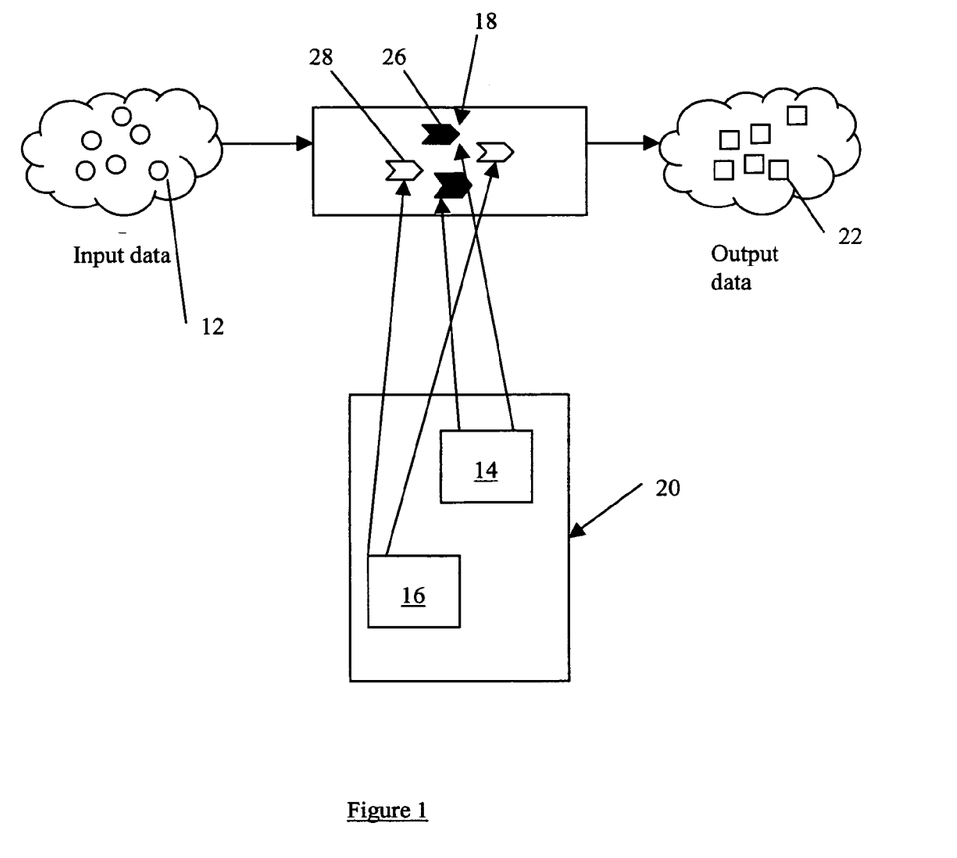
FIG. 1 shows a data transformation system.

Generally, data transformation is a process of modifying and processing data content from an input data structure to obtain and/or transmit useful information in a different format or output data structure. A software artifact or module is a reusable component such as a program unit used as a procedure or more importantly, a data transformation, such that one or more transformation modules can be combined to effect a data transformation of a data structure. FIG. 1 demonstrates a set of circular input data structures 12 that can be transformed into square output data structures 22. The solid black chevrons represent a visually based transformation module 26, and the white chevrons represent other language based transformation modules 28.

There are two programming methods to describe transformations of the data structures 12: a visual editor 14 and a language-based editor 16. Both editors 14,16 are used to construct executable transformation modules 26,28 (which can correspond to routines) that are accessed to help direct a data transformation engine DTE1, DTE2 (see FIG. 2) of a deployment environment 201,202 to transform the input data structures 12 of a first data format to the transformed data structure 22 of a second data format different from the first data format, using deployment modules DM1,DM2. Both transformation methods of the editors 14,16 may coexist in a development environment 20 (see FIG. 2—such as a local or distributed computing environment), since each of these transformation processes can offer advantages in performing some specific programming tasks. It is recognized that the editors 14,16 can be represented by software implemented on computer systems (not shown).

Figure 2:
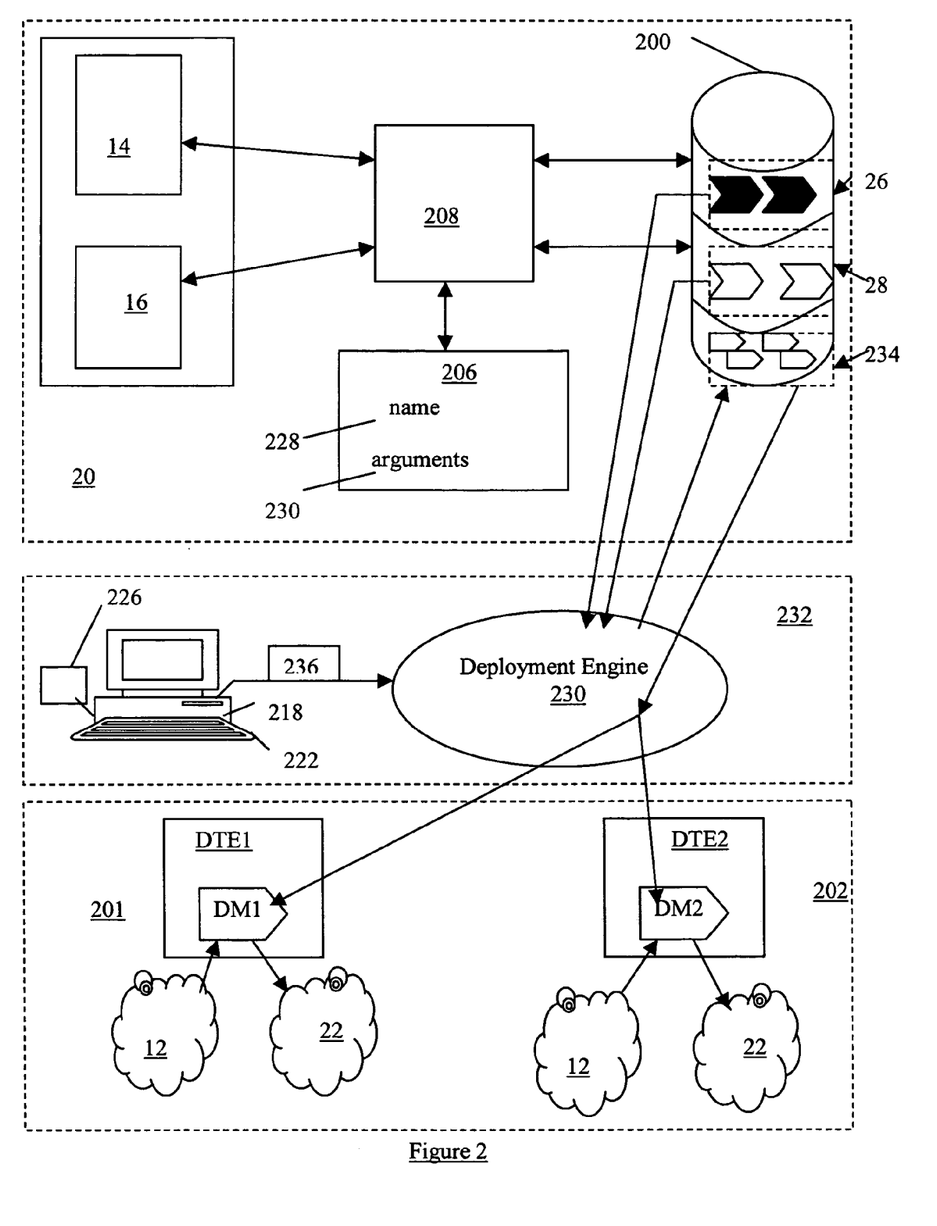
FIG. 2 shows a deployment environment of the transformation modules of FIG. 1.

Referring to FIGS. 1 and 2, the transformation modules 26,28 created by both of these transformation editors 14,16 are stored in files in a memory 200 of the development system 20. There can be one or more data transformation modules 26,28 in memory 200. The solid black chevrons represent the visually generated transformation modules 26 and the white chevrons represent the language-based modules 28. Each type of module 26,28 is stored in different containers in a file system (usually in files) of the memory 200, and each file may contain several such reusable modules 26,28. Once the modules 26,28 are loaded into the working memory of a computer processor, the modules 26, 28 have access to each other through references in a transformation module registry 206 (such as but not limited to a symbol table), as further described below.

Referring again to FIG. 2, the modules 26,28 of the two different types are transformed into a common model format (such as but not limited to a common object model format) as common modules 234 for subsequent reconfiguration as the deployment modules DM1, DM2. A deployment engine 230 of a pre-deployment environment 232 can use a format module to create the common modules 234, such that the original modules 26,28 are transformed into the common format suitable for subsequent implementation in the selected deployment environment 201,202. An example of transforming the transformation modules 26,28 to the common model format of the common module 234 is further described below with reference to FIGS. 7 and 8.

Figure 3:
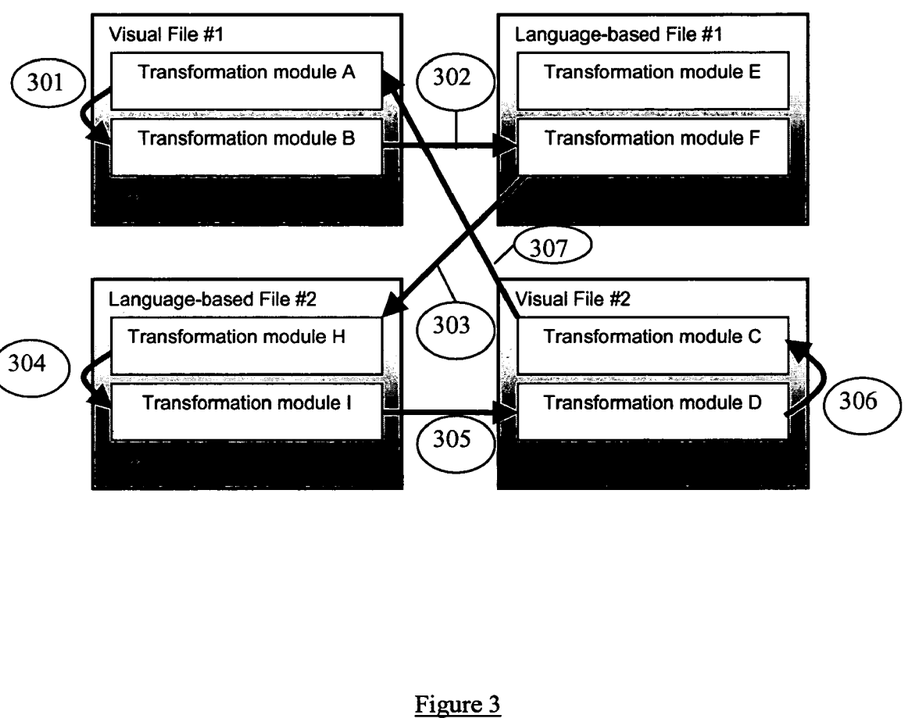
FIG. 3 shows the integrated, seamless reuse of visual and language-based modules of the system of FIG. 2.

The deployment environments 201, 202 use indirectly or directly the resulting common modules 234, representing the modules 26,28 that are stored in the memory 200 once created by the editors 14,16. The pre-deployment environment 232 provides the common modules 234 that are subsequently used in the form of the deployment modules DM1,DM2 for implementing a set of linked transformation modules 26,28, for example as shown in FIG. 3. The deployment modules DM1, DM2 are executed in the environments 201, 202 by the data transformation engines DTE1, DTE2, implemented by corresponding computer systems (not shown) with corresponding runtimes. It is recognized that the engines DTE1, DTE2 could represent different deployment environments 201,202 using different representations of the original common modules 234, for example DM1 and DM2 respectively each having different linked libraries, syntax, and/or compiling considerations as required by the respective environments 201,202. Therefore, one common module 234 (or set thereof) could be configured by the deployment engine 230 as different modules DM1, DM2 suitable for different deployment environments 201,202. An example of transforming the common module 234 to the deployment module DM1,DM2 is further described below with reference to FIG. 9.

It is also recognized in an alternative embodiment that the step of creating the common modules 234 could be bypassed for a specific deployment module DM1 or DM2 for a predefined deployment environment 201 or 202, hence effecting a direct reconfiguration of the linked transformation modules 26,28 to the common model platform as executable modules DM1 or DM2. This direct reconfiguration could be effected by combining the functionality of the editors 14,16 with the deployment engine 230 for generating directly the deployment modules DM1 or DM2 for the predefined environment 201,202 (using the common model for both the visual and language based original modules 26,28, thereby bypassing the step of generating the intermediate common modules 234. This alternative embodiment would combine the development 20 and pre-deployment 232 environments).

Referring again to FIG. 2, the engines DTE1,DTE2 are directed by a user interface 222 interacting with a deployment engine 230 in the pre-deployment environment 232. The interface 222 is coupled to a processor 218, to interact with a user (not shown) to deploy the data transformation represented by the set of one or more linked modules 26,28. The user interface 222 can include one or more user input devices such as but not limited to a QWERTY keyboard, a keypad, a trackwheel, a stylus, a mouse, a microphone and the user output device such as an LCD screen display and/or a speaker. If the screen is touch sensitive, then the display can also be used as the user input device as controlled by the processor 218. The user interface 222 is employed by the user to coordinate the corresponding Data Transformation Engine (DTE1, DTE2) of the deployment environment 201,202 to implement the data transformation of the deployment modules DM1,DM2, as described by the selected set of the modules 26,28 in the memory 200. The engine DTE1,DTE2 takes as input one or more modules DM1,DM2, and the data 12 in a Source format (or a pointer to where the data is stored). The engine DTE1, DTE2 will output the data 22 in a Target format as described originally by the modules 26,28 used in the transformation process executable as the modules DM1, DM2. The engine DTE1,DTE2 interacts with the user interface 222 and the deployment engine 230 so that the user can specify what data 12 is to be transformed, and by which modules 26,28 used to construct and execute the corresponding deployment modules DM1,DM2. It is recognized that the interface 222 could be used to coordinate the creation of the deployment modules DM1,DM2 and could also be used to express the editors 14,16, if desired. Hence the functionality of the user interface 222 could overlap in both the development 20 and the pre-deployment 232 environments.

Further, it is recognized that the user interface 222 can include a computer readable storage medium 226 coupled to the processor 218 for providing instructions to the processor 218, the deployment engine 230, and/or to load/update the modules 26,28 in the memory 200 for referencing by the deployment modules DM1,DM2. The computer readable medium 226 can include hardware and/or software such as, by way of example only, magnetic disks, magnetic tape, optically readable medium such as CD/DVD ROMS, and memory cards. In each case, the computer readable medium 226 may take the form of a small disk, floppy diskette, cassette, hard disk drive, solid state memory card, or RAM provided in the memory 200. It should be noted that the above listed example computer readable mediums 226 can be used either alone or in combination. It is also recognized that the editors 14,16 can have individual interfaces, processors, and mediums 226 as described above in order to configure the editors 14,16 to access modules 26,28 resident in the storage 200 through a symbol table 206. Further, the mediums 226 could be used to program the editor 14,16 to interact or otherwise emulate the functionality of a referencing module or extractor 208 in conjunction with the table 206, as further described below.

Figure 4:
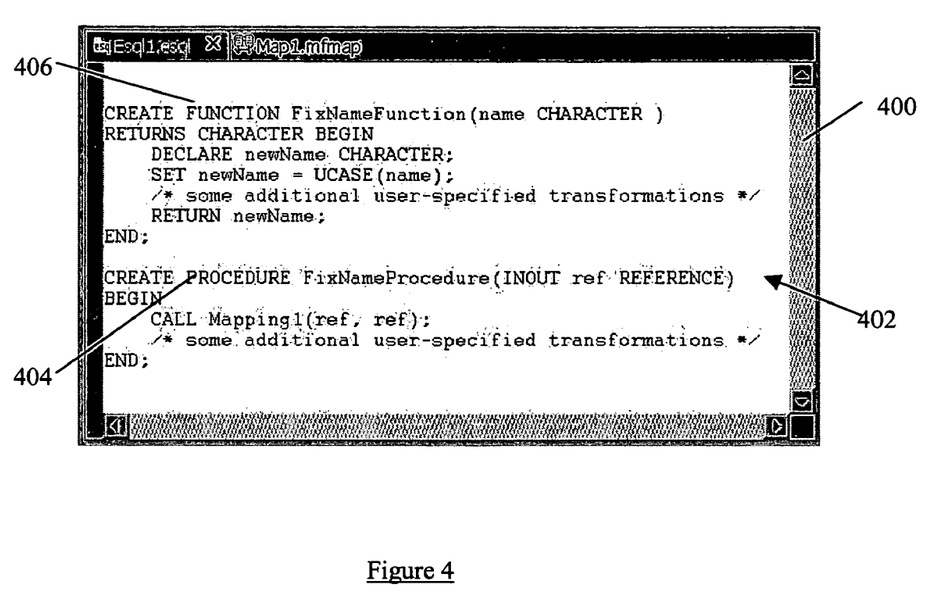
FIG. 4 is a language-based transformation module (ESQL routines) of the system of FIG. 1.

The language based editor 16 of the development environment 20 comprises a user interface and the other functionality required to create the language transformation modules 28 (an example of which is shown in FIG. 4). When the module 28 is created;

1. the module 28 is sent to the appropriate file in storage 200, and
2. the extractor module 208 parses certain fields from the module 28 (e.g. the module's name, parameters or input taken, and output or data type returned) so that the symbol table 206 can be updated to reflect the presence and capabilities of the created module 28 now resident in the memory 200.

The contents of the symbol table 206 can be used by external entities (other modules 26,28,DM1,DM2,CM, the user interface 222, and/or the editors 14,16) to reference and otherwise link to selected modules 26,28 resident in the memory 200. It is recognized that the memory 200 can be a local or distributed storage environment.

Figure 5:
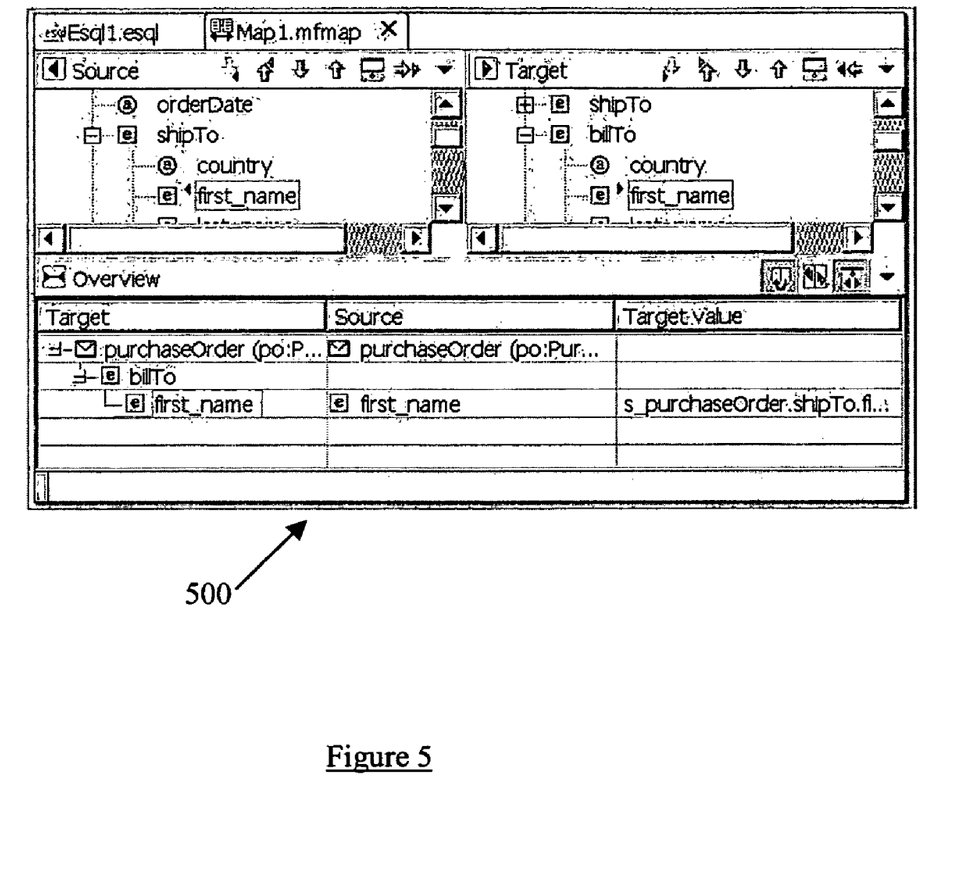
FIG. 5 is a visually constructed transformation module (mapping routine) of the system of FIG. 1.

The visually based editor 14 comprises a graphic user interface and the other functionality required to create the visual based transformation modules 26 (an example of which is shown in FIG. 5). The editor 14 also includes a visual interface to the symbol table 206, so that the user can incorporate existing modules of either type (i.e. 26 and 28). When the module 26 is created, it is sent to the storage 200, and also passed through the extractor 208 so that the symbol table 206 can be updated. The symbol table 206 uses a common symbol model to store the particulars of both types of modules 26, 28 created using either editor 14,16. Accordingly, the modules 26, 28 can reference other modules 26, 28 of either type through the symbol table 206. Further, it is recognised that an existing module 26, 28 can also be modified for re-use, in regard to backwards-compatibility of existing libraries of transformation modules (not shown). For example, existing modules 26, 28 could be incorporated into the system 20 by firstly running them through the extractor 208 to update the symbol table 206 with references to the now updated modules 26, 28, and secondly storing each updated module 26, 28 in the appropriate file in the storage 200. This would facilitate old modules 26, 28 to later be used or modified using the integrated development system 20 employing both the language and/or the visual transformation methods of the editors 14,16, thereby enabling linking between visual-visual, language-language, and/or visual-language module sets.

The editors 14,16 use the extractor 208 to populate the table 206 using selected information about the modules 26, 28 created, edited, and/or otherwise accessed by the editors 14,16 The table 206 contains certain identification information 228 and content information 231 of both the visual 26 and language 28 based modules contained in the memory 200. For example, the identification information 228 could include such as but not limited to the "name" of the modules 26, 28. The content information 231 can include such as but not limited to a list of arguments and argument types used by the modules 26, 28, as well as a descriptive summary of the functionality of each of the modules 26, 28. Accordingly, the extractor 208 updates the table 206 with reference information 228,231 for both module 26, 28 types accessible through the memory 200.

FIG. 3 shows how to reuse visual 26 and language-based 28 modules seamlessly to assemble the transformation program represented by the deployment modules DM1,DM2. Whether the transformation modules 26, 28 are constructed using the visual editor 14 or the language-based editor 16, whatever transformation editor is used could be completely transparent to the programming environment and to the programmer for ease of use.

Regardless of the method used for their construction, the data transformation modules 26, 28 can be called from other modules 26, 28 that are part of the memory 200 and the table 206. All module calls shown in the example from FIG. 3 are legal (in the sense of proper use in a data processing environment), in that:

call 301—visually constructed transformation module (a) to another visually constructed transformation module (b) within the same file;

call 302—visually constructed transformation module (b) to a language-based transformation module (f) in a different file;

call 303—language-based transformation module (f) to another language-based transformation module (h) in a different file;

call 304—language-based transformation module (h) to another language-based transformation module (i) within the same file;

call 305—language-based transformation (i) module to a visually constructed transformation module (d) in a different file;

call 306—visually constructed transformation module (d) to another visually constructed transformation module (c) within the same file; and, call 307—visually constructed transformation module (c) to another visually constructed transformation module (a) in a different file.

It is recognized that the modules (a)-(i) are stored in memory 200 and each has reference information stored in the table 206, such that the reference information facilitates the coupling between the various modules (a)-(i). The language used in this specific application domain of the system 20 can be for example, ESQL (Expanded Structured Query Language), a procedural language based on the SQL standard. The components of the data transformation module 26, 28 correspond to ESQL routines (that is, functions and procedures).

Figure 6:
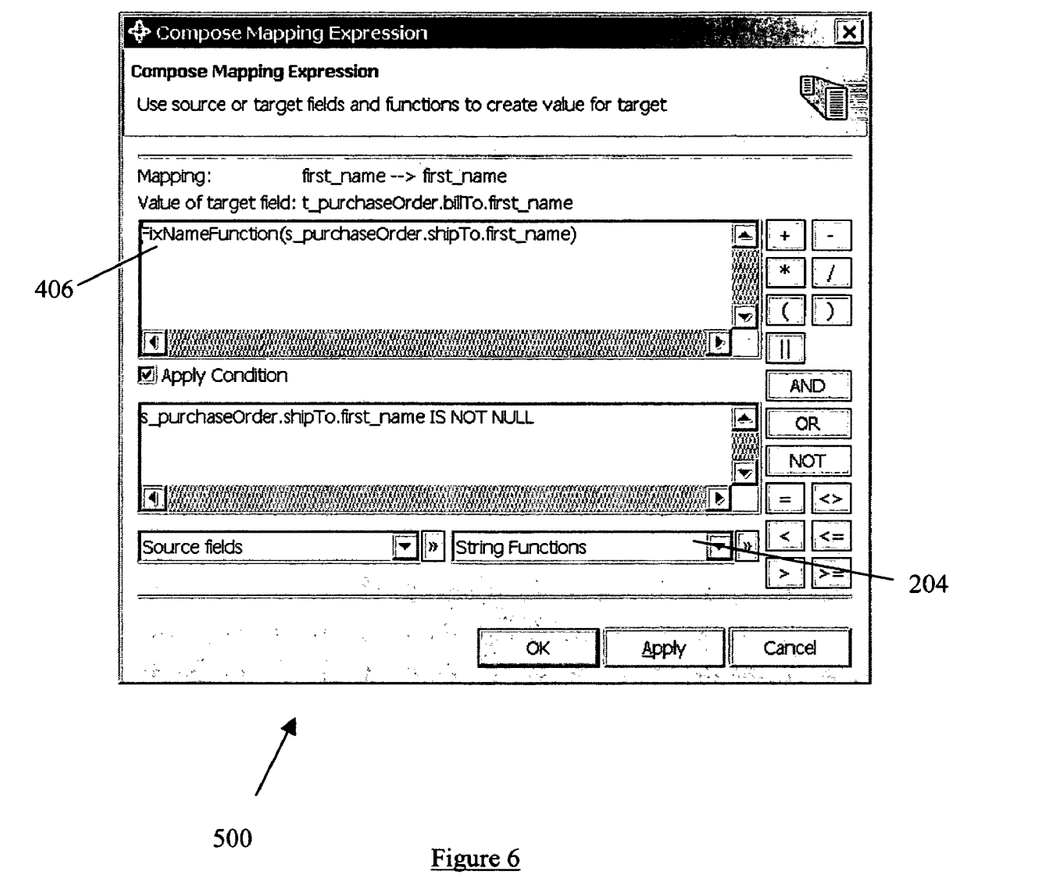
FIG. 6 is a visually constructed routine that calls a language-based routine.

The below described examples of FIGS. 4,5,6 show a very simple case where a visual module 500 reuses a language based module 400, and where the language based module 400 reuses the visually generated module 500, as generated by the editors 14,16 of the development environment 20 (see FIG. 2).

FIG. 4 shows the language-based transformation module 400 (ESQL routines). We see sample source code 402 showing how two different routines are written: a procedure 404 and a function 406. Observe that the function 406 FixName-Function calls a reusable routine called Mapping procedure 404, which is generated using the visual editor 14 and represented by the visually constructed transformation module 500 (see FIG. 5). The module 500 shows how a direct assignment occurs between two data structures 12,22 that are modeled graphically as trees. We may wish to assign the value of the input field first_name in the ship_to data structure to the field first_name in the bill_to data structure, or to perform some operation on this field's input before the actual assignment.

FIG. 6 shows the visually constructed routine 500 calling the language-based routine 400. We now consider the case where the task is not a simple assignment but we need to perform some additional work. In this case, we can reuse a language based module 400 from the visual module 500 using a composer dialog. This dialog allows the user to develop a complex transformation that reuses the function 406 called FixNameFunction that is developed using the language based editor 16. Observe that in the dialog, there can be additional tools that allow the user to reuse function libraries of pre-existing language based modules 28 such as string library functions referenced through the symbol table 206 of the development environment 20.

Referring again to FIG. 2, the user interface 222 of the pre-deployment environment 232 is used by the user to direct the deployment engine 230 by an instruction message 236 to select a number of the modules 26,28 (potentially represented by the common modules 234) for further refinement as the deployment modules DM2,DM2, as required by the selected engines DTE1,DTE2. The modules DM1,DM2 represent the user defined data transformations for the data 12,22 using the functionality of the originally defined modules 26,28 linked in the user specified way. The message 236 directs the deployment engine 230 which modules 234 (representing the original modules 26,28) should be included in the modules DM1, DM2. The form of the modules DM1,DM2 is selected based on the runtime requirements of the corresponding engines DTE1,DTE2.

Figure 7:
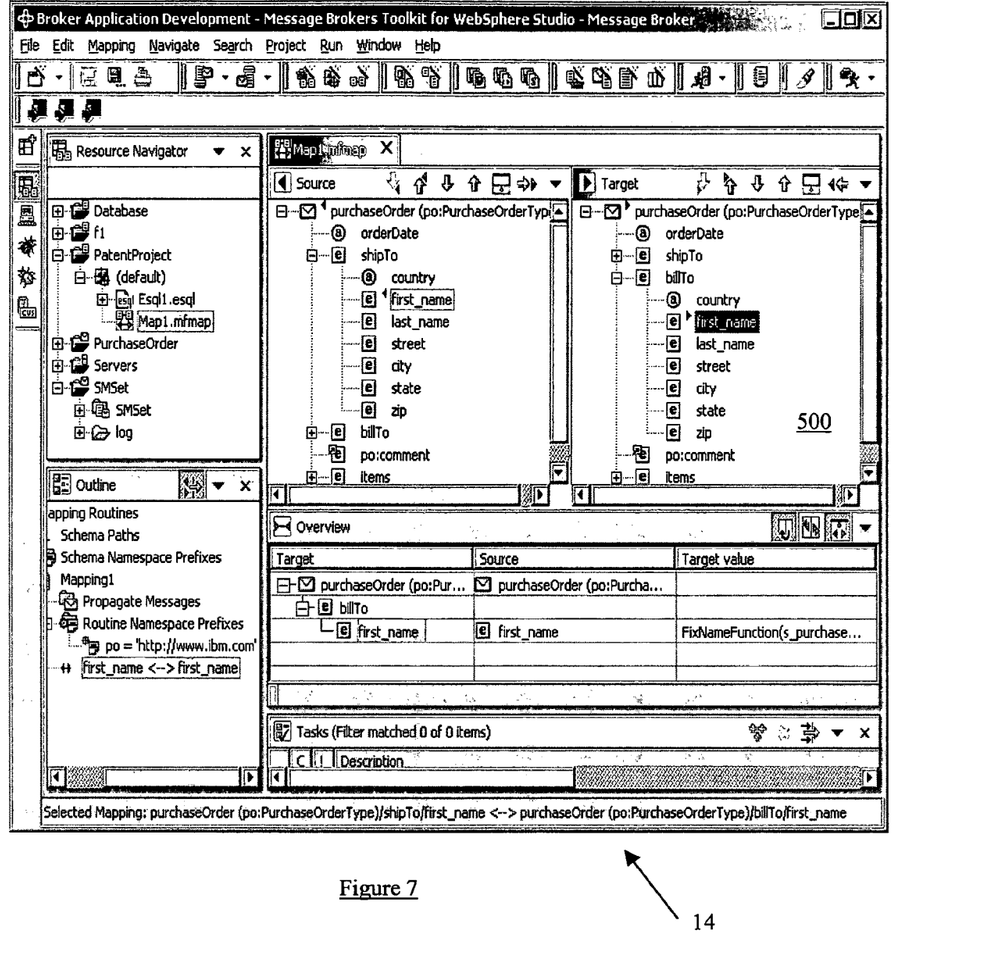
FIG. 7 is a visual editor of FIG. 1.
Figure 8:
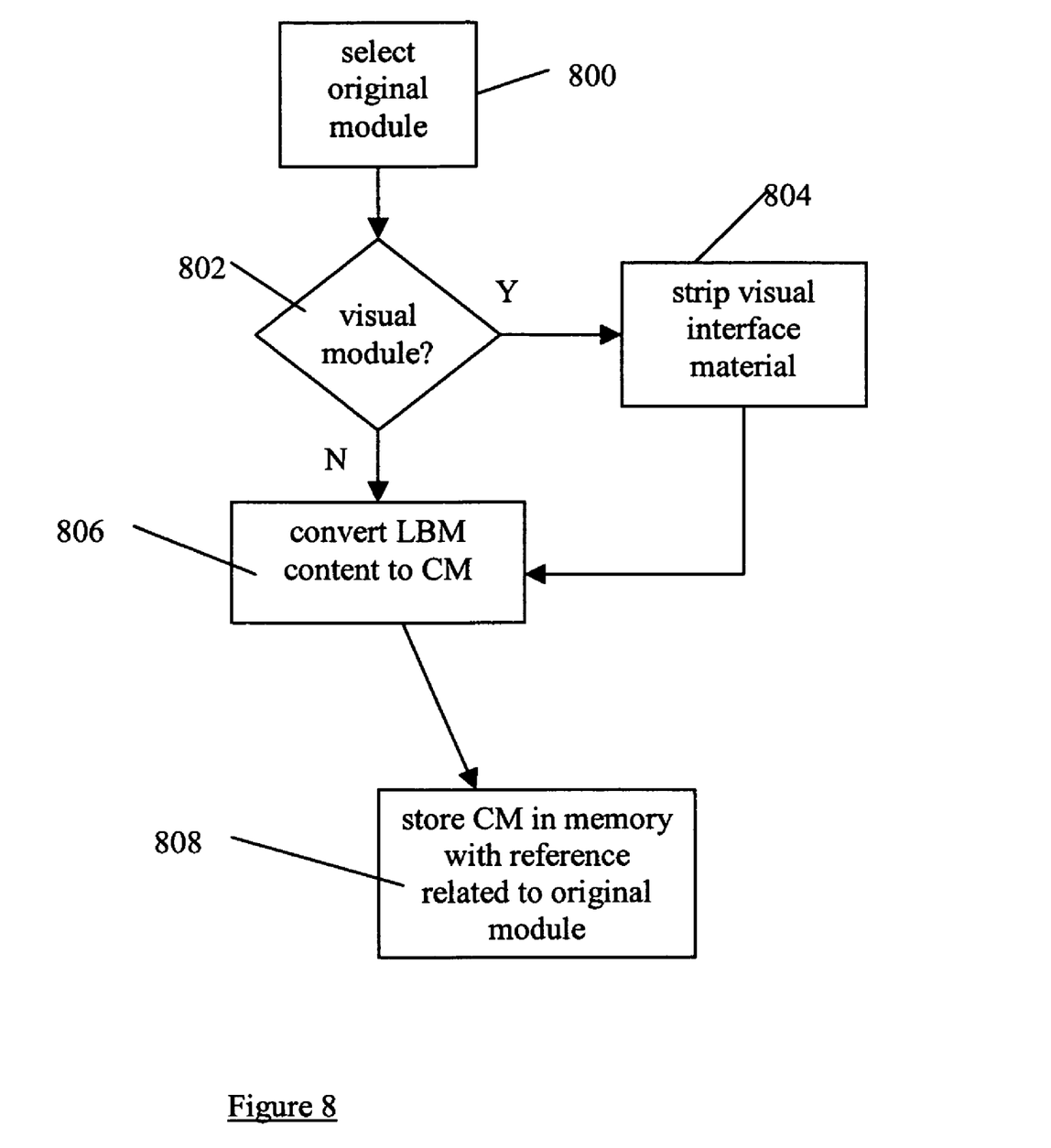
FIG. 8 demonstrates conversion to a common model format of the modules of FIG. 1.

Referring to FIGS. 2, 7, and 8, the deployment engine 230 transforms the visual module (VBM) 28 (specific example module (VBM) 500) to the common model format for representation as one of the common modules (CM) 234. For example:

1. Visual Mapping Example

The VBM 500 is selected 800, 802 and then stripped 804 of the visual interface contents not required for performing the inherent programmed data transformation function of the module 500. The stripped module 500 is then converted 806 to the corresponding CM 234 format (such as but not limited to being converted to the same format as the language based modules 26 (LBM)—the common model format) to convert the VBM 500 to, for example, the CM 234 represented as,

```
CREATE PROCEDURE Mapping1(
    IN s_purchaseOrder REFERENCE {'http://www.ibm.com'}:PurchaseOrderType,
    IN t_purchaseOrder REFERENCE {'http://www.ibm.com'}:PurchaseOrderType)
BEGIN
DECLARE po NAMESPACE 'http://www.ibm.com';
    --$IBM_WBIMB_XMIID=ConditionalAssignmentStatement_1#condition
    IF s_purchaseOrder.shipTo.first_name IS NOT NULL THEN
    --$IBM_WBIMB_XMIID=ConditionalAssignmentStatement_1
    SET t_purchaseOrder.billTo.first_name =
FixNameFunction(s_purchaseOrder.shipTo.first_name);
    END IF;
END;
```

2. Language Mapping Example

Further, when selected 800,802 by the deployment engine 230, the LBM 28 (specific example 400—see FIG. 4) is converted 806 into the common model format of the CM 234, in this simplified case the format of the original LBM 28, for example the CM 234 represented as,

```
CREATE FUNCTION FixNameFunction(name CHARACTER )
RETURNS CHARACTER BEGIN
    DECLARE newName CHARACTER;
    SET newName = UCASE(name);
    /* some additional user-specified transformations */
    RETURN newName;
END;
CREATE PROCEDURE FixNameProcedure(INOUT ref REFERENCE)
BEGIN
    DECLARE newName CHARACTER;
    SET newName = FixNameFunction(newName);
    CALL Mapping1(ref, ref);
    /* some additional user-specified transformations */
END;
```

It should be noted that in the above described implementation format CM 234 is equivalent to format LBM 28 (e.g. a unit transformation). Also, the VBM 26 format was converted to the LBM 28 format to get the corresponding CM 234 format. However, in the general case this is not necessarily required. In the general case, the common model format of the CM 234 can be created for both the individual LBMs 28 and the VBMs 26 resident in the memory 200, such that the common model format is different from both original formats of the modules 26,28 produced by the editors 14,16. For example, the CM 234 common format can be a script like generic format that contains (but it not limited to) the following information:

Name 228 (see FIG. 2) of the CM 234;

Argument list 231 (see FIG. 2) including types;

The transformations (one or more of the following)

assign target(s) to source(s)

assign operation on source(s) to target(s); and

Links (references) to other CMs 234, which may also be stored in a different place other than memory 200 that is accessed by the deployment engine.

Given this information, the common modules 234 architecture contain all information that is required to implement the inherent transformation functionality of the original modules 26,28 as created by the editors 14,16. Issues to consider when converting from VBM 26/LBM 28 to CM 234 are such as but not limited to:

Information to store so that the CM 234 has a generic enough structure to generate the modules DM1,DM2 by establishing a sufficient interface for the transformation between the DM1,DM2 and the CM; and Separate out the contents of the transformation between the DM1,DM2 and the CM into general operations rather than language specific terms.

Figure 9:
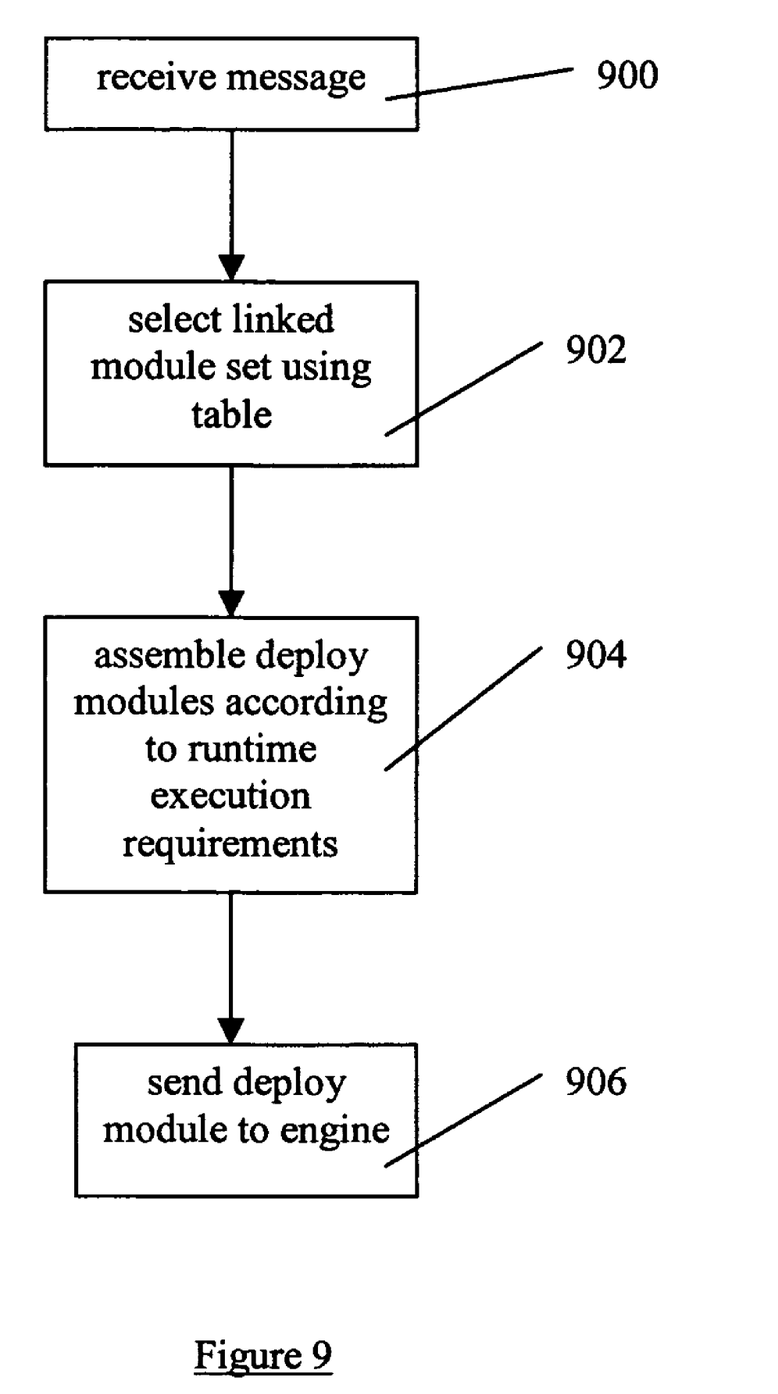
FIG. 9 demonstrates conversion to a deployment module of the converted modules of FIG. 8.

Referring to FIGS. 2 and 9, the deployment engine 230 is used to transform the set of interlinked common modules 234, defined by receiving 900 the message 236. The message 236 can make reference to the individual common modules 234 themselves, or to the original modules 26,28. In any event, the interlinking between the modules 26,28 (and corresponding modules 234) is represented 902 by the information 228,231 of the symbol table 206. The deployment engine 230 makes 904 the required syntax changes and other changes to convert the set of common modules 234 into the module DM1,DM2 that is specific to a given target language of the corresponding deployment environment 201,202 (for example native code). The generated modules DM1,DM2 are then executed 906 on the corresponding engines DTE1,DTE2. The DM1,DM2 can be one or more modules representing one or more common modules 234 (representing the original one or more original modules 26,28). It is recognized that the transformation 904 of the common modules 234 into the appropriate deployment module(s) DM1,DM2 can involve assignments that are different for each respective native language used by the various deployment environments 201,202. Further, the deployment module DM1,DM2 can contain other content that is runtime specific, such as but not limited to byte code differences, library linking and compiling particulars.

The following is an example transformation of the common module 234 into a deployment module DM1:

```
CREATE COMPUTE MODULE "IBM_WBIMB_Mapping1"
CREATE FUNCTION Main( ) RETURNS BOOLEAN BEGIN
    DECLARE po NAMESPACE 'http://www.ibm.com';
    DECLARE s_purchaseOrder REFERENCE TO InputRoot.MRM;
    CALL IBM_WBIMB_CopyHeaderAndSetMQRFH2('mrm',
'PurchaseOrder', 'purchaseOrder', 'null');
    SET OutputRoot.Properties.MessageType = 'purchaseOrder';
    SET OutputRoot.Properties.MessageSet = 'PurchaseOrder';
    CREATE FIELD OutputRoot.MRM;
    DECLARE t_purchaseOrder REFERENCE TO OutputRoot.MRM;
    CALL Mapping1(s_purchaseOrder, t_purchaseOrder);
    RETURN TRUE;
END;
CREATE PROCEDURE IBM_WBIMB_
CopyHeaderAndSetMQRFH2 (
        IN parserDomain CHARACTER,
        IN messageSet CHARACTER,
        IN messageName CHARACTER,
        IN wireFormat CHARACTER)
```

```
BEGIN
    -- copy all input headers
    DECLARE c INTEGER CARDINALITY(InputRoot.*[ ]);
    DECLARE i INTEGER 1;
    WHILE i < c DO
        -- loop till the second last one, since the last one is the
body
        SET OutputRoot.*[i] = InputRoot.*[i];
        SET i = i + 1;
    END WHILE;
    -- define a cursor to point to MQRFH2 headers
    DECLARE Cursor REFERENCE TO OutputRoot.MQRFH2;
    DECLARE foundRFH2 BOOLEAN FALSE;
    -- move the cursor to the last MQRFH2
    WHILE LASTMOVE(Cursor) DO
        set foundRFH2 = TRUE;
        MOVE Cursor NEXTSIBLING;
    END WHILE;
    -- set mcd in the last MQRFH2
    IF foundRFH2 THEN
        SET Cursor.mcd.Msd = parserDomain;
        SET Cursor.mcd.Set = messageSet;
        SET Cursor.mcd.Type = messageName;
        IF wireFormat <> NULL THEN
            SET Cursor.mcd.Fmt = wireFormat;
        END IF;
    END IF;
END;
END MODULE;
```

Here is another example conversion of the above described common module 234 into the module DM2 for a different runtime engine DTE2.

```
BEGIN
    DECLARE po NAMESPACE 'http://www.ibm.com';
    DECLARE s_purchaseOrder REFERENCE TO InputRoot.MRM;
    CALL IBM_WBIMB_CopyHeaderAndSetMQRFH2('mrm',
'PurchaseOrder', 'purchaseOrder', 'null');
    SET OutputRoot.Properties.MessageType = 'purchaseOrder';
    SET OutputRoot.Properties.MessageSet = 'PurchaseOrder';
    CREATE FIELD OutputRoot.MRM;
    DECLARE t_purchaseOrder REFERENCE TO OutputRoot.MRM;
    CALL Mapping1(s_purchaseOrder, t_purchaseOrder);
    RETURN TRUE;
END;
CREATE PROCEDURE IBM_WBIMB_CopyHeaderAndSetMQRFH2 (
        IN parserDomain CHARACTER,
        IN messageSet CHARACTER,
        IN messageName CHARACTER,
        IN wireFormat CHARACTER)
BEGIN
    -- copy all input headers
    DECLARE c INTEGER CARDINALITY(InputRoot.*[]);
    DECLARE i INTEGER 1;
    WHILE i < c DO
        -- loop till the second last one, since the last one is the
body
        SET OutputRoot.*[i] = InputRoot.*[i];
        SET i = i + 1;
    END WHILE;
    -- define a cursor to point to MQRFH2 headers
    DECLARE Cursor REFERENCE TO OutputRoot.MQRFH2;
    DECLARE foundRFH2 BOOLEAN FALSE;
    -- move the cursor to the last MQRFH2
    WHILE LASTMOVE(Cursor) DO
        set foundRFH2 = TRUE;
        MOVE Cursor NEXTSIBLING;
    END WHILE;
    -- set mcd in the last MQRFH2
    IF foundRFH2 THEN
        SET Cursor.mcd.Msd = parserDomain;
        SET Cursor.mcd.Set = messageSet;
        SET Cursor.mcd.Type = messageName;
        IF wireFormat <> NULL THEN
            SET Cursor.mcd.Fmt = wireFormat;
        END IF;
    END IF;
END;
```

Given the above information, the modules DM1,DM2 architecture contains all information that is required to implement the inherent transformation functionality of the original interlinked modules 26,28, as created by the editors 14,16, for executing the data transformation involving mixed and/or same mode module linkages (e.g. visual-visual, language-language, language-visual pairings). Issues to consider when converting from the CM 234 (or for the case of from the original VBM 26/LBM 28) are such as but not limited to:

Adjustments made for satisfying the target deployment runtime architecture of the engines DTE1,DTE2. For instance, in the sample runtime provided, all CMs 234 are combined into a single module DM1,DM2. This is not a requirement, of course.

The CM 234 could be simultaneously publishable in many different runtime environments 210,202 (i.e the CM 234 could be general enough for general deployment as a variety of different modules DM1,DM2, etc . . . ).

It will be appreciated that variations of some elements are possible to adapt the invention for specific conditions or functions. The concepts of the present invention can be further extended to a variety of other applications that are clearly within the scope of this invention. For example, the above described deployment model is a language centric model using a language based format as the common model format of the CMs 234. It is recognized that a visual centric model may be developed instead. Having thus described the present invention with respect to preferred embodiments as implemented, it will be apparent to those skilled in the art that many modifications and enhancements are possible to the present invention without departing from the basic concepts as described in the preferred embodiment of the present invention. Therefore, what is intended to be protected by way of letters patent should be limited only by the scope of the following claims.

The invention claimed is:

1. A method for deploying a set of coupled data transformation modules, the method comprising the steps of:
employing a graphical user interface to receive an instruction for selecting the set of transformation modules from a memory and to generate an instruction message for coordinating creation of converted common models based on the selected set of transformation modules, wherein the set of transformation modules describe a data transformation for transforming a data structure from a first format to a second format;
converting each of the set of transformation modules to a common model format to form converted common modules, the set of modules having a first transformation module being a language constructed module constructed using a language based editor and a second transformation module being a visually constructed module constructed using a visual based editor, wherein one of the first module or the second module references the other of the first module or the second module;

updating a module registry to include entries corresponding to each of the converted common modules, wherein updating the module registry to include entries corresponding to each of the converted common modules comprises, in response to the instruction including a name of each of the converted common modules in the entries of the registry, the names for retrieving corresponding common modules from the memory;

generating an executable version of the converted transformation modules for execution by a data transformation engine to form at least one deployment module, wherein the executable version when executed transforms the data structure from the first format to the second format, wherein the common model format contains information for use in implementing transformation functionality of the set of transformation modules, wherein the common model format is different from both a format of the language constructed modules and a format of the visually constructed modules, and wherein the common model format is generic for generation of the executable version for a selected one of a plurality of runtime environments for a data transformation engine, and wherein generating an executable version of the converted transformation modules comprises removing a portion of visual interface contents from the visually constructed module during conversion of the visually constructed modules to the common model format; and executing the at least one deployment module in one or more deployment engines to transform the data structure from the first format to the second format.

2. The method of claim 1, further comprising reconfiguring a given transformation module directly into the executable version of the coupled transformation module.

3. The method of claim 1, wherein receiving the instruction for selecting the set of transformation modules is performed after converting the set of transformation modules to a common model format.

* * * * *